(12) United States Patent  (10) Patent No.: US 8,519,275 B2
Hashimoto et al.  (45) Date of Patent: Aug. 27, 2013

(54) ELECTRONIC DEVICE

(75) Inventors: Seiji Hashimoto, Oume (JP); Kohei Wada, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 266 days.

(21) Appl. No.: 12/860,731

(22) Filed: Aug. 20, 2010

(65) Prior Publication Data

US 2011/0155451 A1 Jun. 30, 2011

(30) Foreign Application Priority Data

Dec. 25, 2009 (JP) ................................ 2009-296176

(51) Int. Cl.
*H02B 1/40* (2006.01)
*F16L 3/08* (2006.01)

(52) U.S. Cl.
USPC ............. 174/480; 174/50; 174/520; 248/74.2

(58) Field of Classification Search
USPC ...... 361/679.55; 174/50, 480, 520; 248/74.2
See application file for complete search history.

(56) References Cited

U.S. PATENT DOCUMENTS

| | | | | |
|---|---|---|---|---|
| 5,804,765 | A * | 9/1998 | Siemon et al. | 174/651 |
| 6,327,139 | B1 * | 12/2001 | Champion et al. | 361/608 |
| 7,459,634 | B2 * | 12/2008 | Martin et al. | 174/97 |
| 7,980,526 | B2 * | 7/2011 | Lord et al. | 248/444 |
| 2003/0026084 | A1 * | 2/2003 | Lauchner | 361/826 |
| 2003/0075646 | A1 * | 4/2003 | Womack et al. | 248/49 |
| 2004/0114313 | A1 * | 6/2004 | Mata et al. | 361/679 |
| 2008/0316694 | A1 * | 12/2008 | Yang et al. | 361/683 |
| 2011/0155448 | A1 * | 6/2011 | Saito et al. | 174/520 |

FOREIGN PATENT DOCUMENTS

| | | |
|---|---|---|
| JP | 48-63291 | 8/1973 |
| JP | 53-52330 | 12/1978 |
| JP | 55-58088 | 4/1980 |
| JP | 59-70390 | 5/1984 |
| JP | 59-89588 | 6/1984 |
| JP | 63-15646 | 2/1988 |
| JP | 06-053672 | 2/1994 |
| JP | U 06-24329 | 3/1994 |
| JP | 10-215084 | 8/1998 |
| JP | 2001-001825 | 1/2001 |
| JP | 2005-019913 A | 1/2005 |
| JP | 2005-218187 | 8/2005 |
| JP | 2006-201584 | 8/2006 |

OTHER PUBLICATIONS

Prior Art Information List.
Decision of a Patent Grant for Japanese Application No. 2009-296176, Mailed May 10, 2012, citing Japanese Reference Nos. 1-10, in 3 pages.
Japanese Office Action for Japanese Application No. 2009-296176, Mailed Jan. 18, 2011, citing Japanese Reference Nos. 1, 3, 4, 6, 7, 8, and 9, in 8 pages.
Japanese Office Action for Japanese Application No. 2009-296176, Mailed Oct. 12, 2010, citing Japanese Reference Nos. 1, 4, 6 and 8, in 7 pages.

* cited by examiner

*Primary Examiner* — Hung Ngo
(74) *Attorney, Agent, or Firm* — Knobbe, Martens, Olson & Bear LLP

(57) ABSTRACT

According to one embodiment, an electronic device includes a cable, a protrusion, and a recessed portion. The cable is routed along a surface of a wall in a housing. The protrusion protrudes on the surface of the wall, and includes a first protrusion and a second protrusion that elastically hold the cable. The recessed portion is formed on the surface between the first protrusion and the second protrusion. The cable is elastically held between the first protrusion and the second protrusion while at least part of the cable is fitted in the recessed portion.

14 Claims, 5 Drawing Sheets

ELECTRONIC DEVICE

CROSS-REFERENCE TO RELATED APPLICATIONS

This application is based upon and claims the benefit of priority from Japanese Patent Application No. 2009-296176, filed Dec. 25, 2009, the entire contents of which are incorporated herein by reference.

FIELD

Embodiments described herein relate generally to an electronic device.

BACKGROUND

For example, Japanese Patent Application Publication (KOKAI) No. 2005-19913 discloses a conventional electronic device having a housing in which a cable is hooked on a hook-like protrusion and routed along the inner surface of the housing.

In the conventional electronic device, the end of the protrusion that protrudes on the inner surface of the housing covers on the cable. The portion that covers the cable increases the height of the protrusion, and therefore the protrusion is not suitably applied to the small space in the housing.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings. In general, according to one embodiment, an electronic device comprises a cable, a protrusion, and a recessed portion. The cable is configured to be routed along a surface of a wall in a housing. The protrusion is configured to protrude on the surface of the wall, and comprises a first protrusion and a second protrusion that elastically hold the cable. The recessed portion is formed on the surface between the first protrusion and the second protrusion. The cable is configured to be elastically held between the first protrusion and the second protrusion while at least part of the cable is fitted in the recessed portion.

Figure 1:
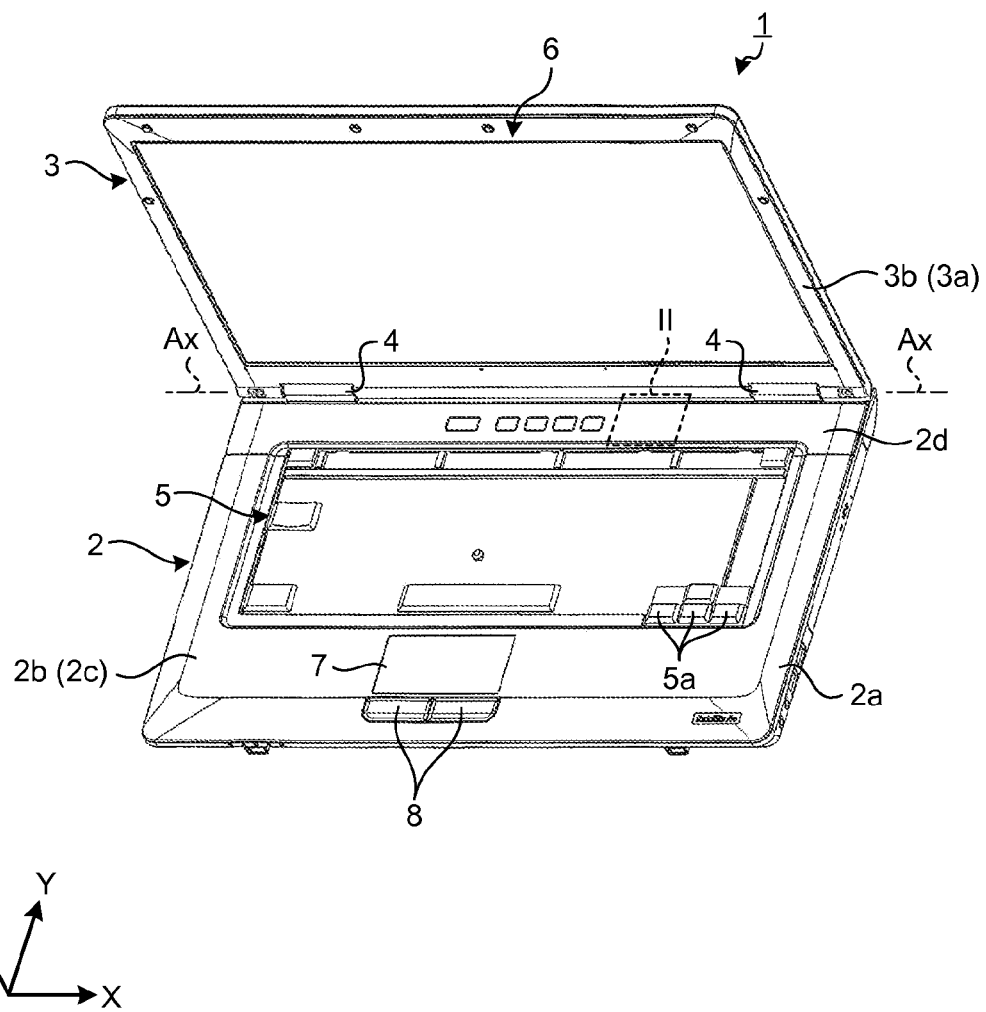
FIG. 1 is an exemplary perspective view of an electronic device according to an embodiment.

As illustrated in FIG. 1, an electronic device 1 of an embodiment is, for example, a notebook personal computer. The electronic device 1 comprises a flat rectangular first body 2 and a flat rectangular second body 3. The first body 2 and the second body 3 are connected by a hinge mechanism 4 to be relatively rotatable about a rotation axis Ax between an open position (FIG. 1) and a closed position (not illustrated). Hereinafter, for the sake of convenience, based on the use state of the electronic device 1, the width direction (horizontal direction) of the first body 2 will be referred to as "X direction", the depth direction of the first body 2 will be referred to as "Y direction", and the thickness direction of the first body 2 will be referred to as "Z direction". X, Y, and Z axes are perpendicular to one another.

The first body 2 is provided with a keyboard 5 as an input device, a pointing device 7, a click button 8, and the like, which are exposed on a front surface 2b as the outer surface of a housing 2a. On the other hand, the second body 3 is provided with a display device 6 such as a liquid crystal display (LCD) panel as an electronic component, which is exposed on a front surface 3b as the outer surface of a housing 3a. When the first body 2 and the second body 3 are in the open position, the keyboard 5, the display device 6, and the like are exposed to allow the user to use them. On the other hand, in the closed position, the front surface 2b closely faces the front surface 3b, and the keyboard 5, the display device 6, the pointing device 7, the click button 8, and the like are covered between the housings 2a and 3a. Incidentally, FIG. 1 does not illustrate all keys of the keyboard 5 but only keys 5a.

Figure 2:
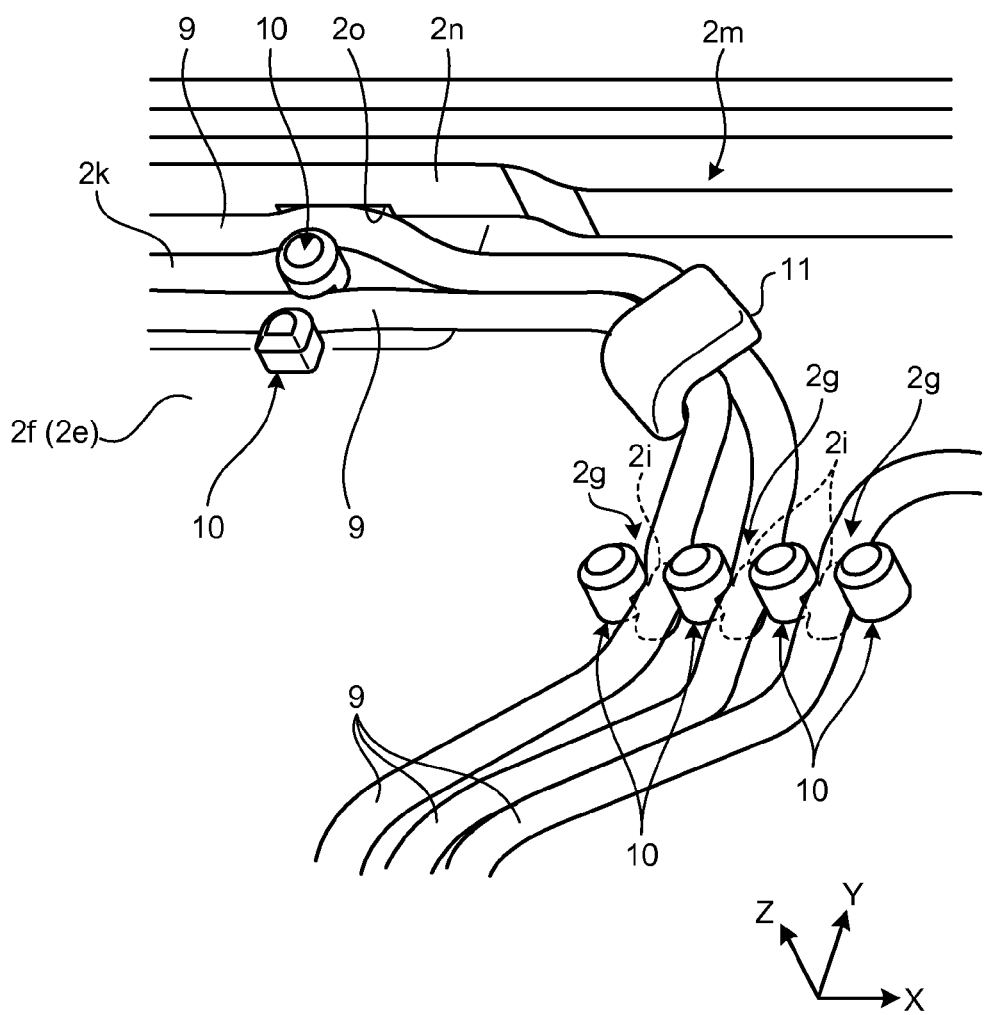
FIG. 2 is an exemplary perspective view of a portion where cables are routed (indicated by II in FIG. 1) inside the housing of the electronic device in the embodiment.

As illustrated in FIG. 2, cables 9 are routed in the housing 2a of the first body 2. The cables 9 may be, for example, antenna cables. In a portion illustrated in FIG. 2 (a portion indicated by II in FIG. 1), a small space with a relatively short height is formed between a bottom wall 2e and a cover 2d that forms part of a top wall 2c of the first body 2. To prevent interference between the cables 9 and other components, the cables 9 are required to be installed along a desired route. In view of this, according to the embodiment, protrusions 10 are provided on an inner surface (front surface) 2f of the bottom wall 2e to fix the cables 9 along the inner surface 2f. The cables 9 are not held by a hook-like protrusion 11 but only hooked.

A description will be given of the four protrusions 10 illustrated on the lower left side of FIG. 2 with reference to FIGS. 3 to 5 in addition to FIG. 2.

Figure 3:
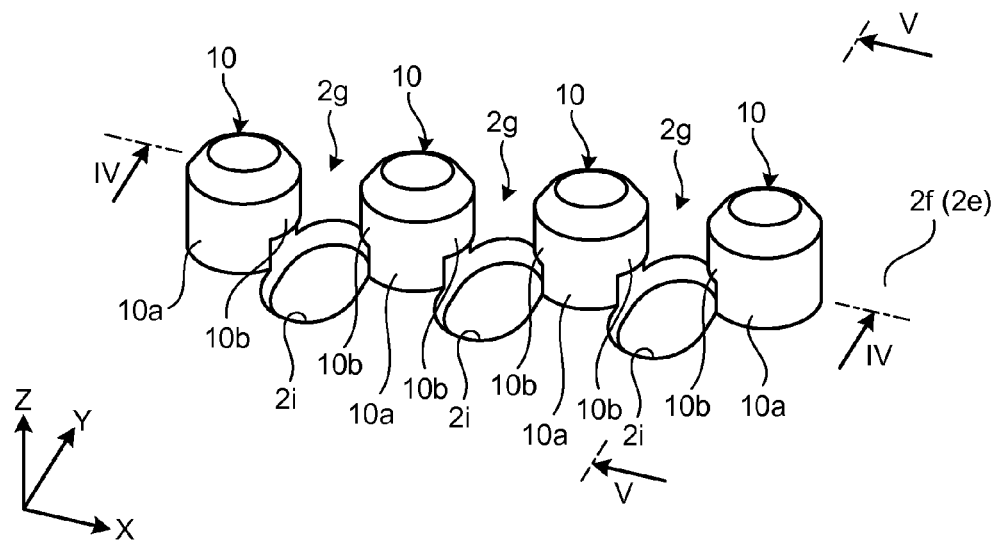
FIG. 3 is an exemplary perspective view of protrusions in the embodiment.

As illustrated in FIGS. 2 and 3, the four columnar protrusions 10 are aligned at regular intervals on the inner surface 2f of the bottom wall 2e. Each of the cables 9 passes through a gap 2g between adjacent two of the protrusions 10. The four protrusions 10 form three gaps (2g) in which the cables 9 are held, respectively. The four protrusions 10 are aligned in a line along the X direction.

A recessed portion 2i is formed between adjacent two of the protrusions 10, and opens toward upward of the inner surface 2f. As illustrated in FIG. 4, the recessed portion 2i is formed as a through hole that passes through the inner surface 2f and back surface 2h of the bottom wall 2e. The recessed portion 2i is elongated in a direction perpendicular to the direction in which the protrusions 10 faces (the Y direction).

With the four protrusions 10, the cables 9 are routed in the Y direction. In the embodiment, the cables 9 are routed in a direction perpendicular to the direction in which adjacent two of the protrusions 10 face (alignment direction) and along the inner surface 2f.

Each of the protrusions 10 comprises a columnar portion 10a and a flared portion 10b. The columnar portion 10a protrudes from the inner surface 2f in a direction perpendicular to the inner surface 2f (the Z direction). The flared portion 10b is located on the top of the columnar portion 10a and flares toward the facing protrusions 10 (toward the inside of the gap 2g in the width direction).

In the embodiment, the bottom wall 2e that includes the protrusions 10 is made of a metal material or a synthetic resin material. As illustrated in FIG. 4, a width W2 of the recessed portion 2i is wider than a width W1 of the gap 2g. When the protrusions 10 and the recessed portion 2i are molded, a mold (not illustrated) for molding the recessed portion 2i is moved from the back surface 2h side to a position beyond the inner surface 2f. That is, when the protrusions 10 and the recessed portion 2i are molded, the base side of the columnar portion 10a is recessed by the mold to form the flared portion 10b on the top of the columnar portion 10a. The flared portion 10b flares in the X direction relative to the base side of the columnar portion 10a.

As a whole, each of the protrusions 10 is formed in a columnar shape, and the periphery of its end portion is chamfered to be tapered. This prevents the protrusions 10 from damaging the cover layer or the like of the cables 9 when the cables 9 come in contact with the protrusions 10. Moreover, the cables 9 are less likely to be caught by the protrusions 10, which facilitates to route (handle) the cables 9.

In the above structure, each of the cables 9 is elastically held between adjacent two of the protrusions 10. The protrusions 10 are different from conventional hooks (such as the protrusion 11) to hook the cables 9 in that they fix each of the cables 9 in the gap 2g between them. This further reliably prevents the cables 9 from being routed in an area other than the desired route or moving. Especially, in the case where the space to route the cables 9 is not so wide, if the cables are not routed along the desired route or move due to an external force or the like, the cables may be stuck between two components (for example, between the housing and the circuit board, between the divisional bodies of the housing, etc.). This may result in damage to the outer surface of the cover layer. Meanwhile, the structure of the embodiment to elastically hold the cables 9 facilitates to fix the cables 9 to a predetermined position, and is effective in such a case. The cables 9 may be elastically held using the elasticity of the cables 9 (their cover layers, etc.) as well as the elasticity of the structure that holds the cables 9 such as the protrusions 10.

In the case where the space to route the cables 9 is not so wide, the height of the protrusions 10 to hold the cables 9 is desired to be as short as possible. Accordingly, in the embodiment, the recessed portion 2i is formed between the protrusions 10, and each of the cables 9 is held between the protrusions 10 while being fitted in the recessed portion 2i. With this, the height of the protrusions can be reduced compared to the case where the cables 9 are held on the inner surface 2f.

Figure 4:
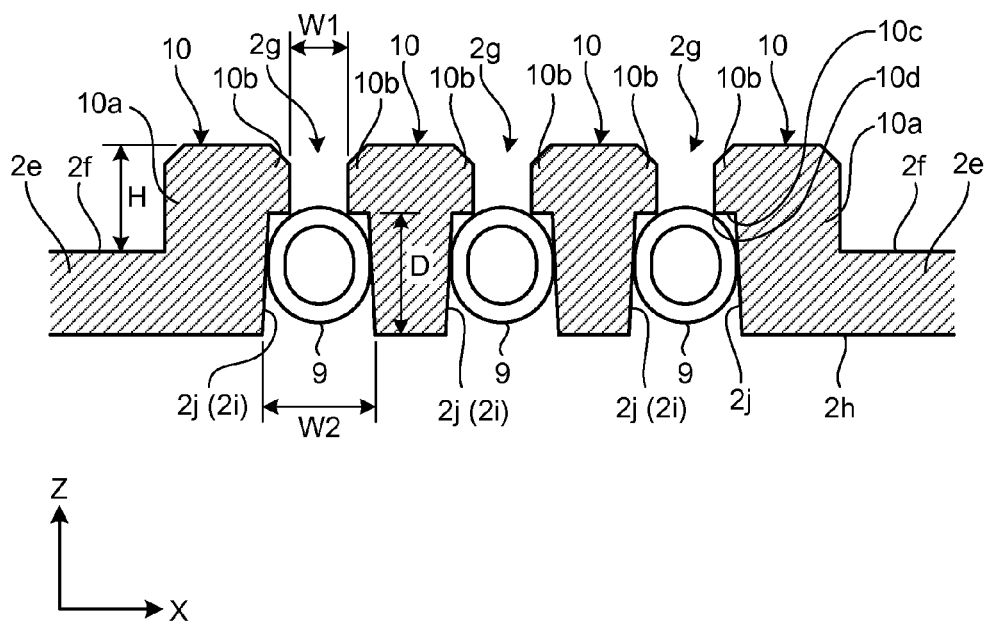
FIG. 4 is an exemplary cross-sectional view taken along line IV-IV in FIG. 3 in the embodiment.

According to the embodiment, as illustrated in FIG. 4, a depth D from a lower surface 10c of the flared portion 10b to the deepest position of the recessed portion 2i (in the embodiment, the back surface 2h) is larger than the diameter of the cables 9 (the diameter of the cables 9 in free state without being applied an external force). This prevents the cables 9 each fitted in the recessed portion 2i from protruding on the side of the inner surface 2f or the back surface 2h of the recessed portion 2i.

According to the embodiment, a width W1 between the flared portion 10b and part of another protrusion facing the flared portion 10b (in the embodiment, the flared portion 10b that faces this flared portion 10b via the gap 2g) is smaller than the diameter of the cables 9 in free state. Thus, it is possible to prevent each of the cables 9 from coming out of the gap 2g.

According to the embodiment, preferably, a height H by which the protrusions 10 protrude from the inner surface 2f is equal to or less than the diameter of the cables 9 in free state. With this, the height of portions where the protrusions 10 are located can be as high as or lower than the height of the cables 9 routed along the inner surface 2f. Thus, trouble is not likely to be caused by providing the protrusions 10. As a result, it is possible to increase the freedom of layout of the protrusions 10, and increase the number of the protrusions 10 to facilitate the installation of the cables 9 along a more desirable route.

According to the embodiment, a width W2 of the recessed portion 2i in a direction perpendicular to the direction in which the cables 9 are routed and the width (=W2) of the gap 2g between the protrusions 10 are equal to or less than the diameter of the cables 9. With this, part of each of the cables 9 fitted in the recessed portion 2i can be held between both sides 2j of the recessed portion 2i, which increases the capability of retaining the cables 9.

Figure 5:
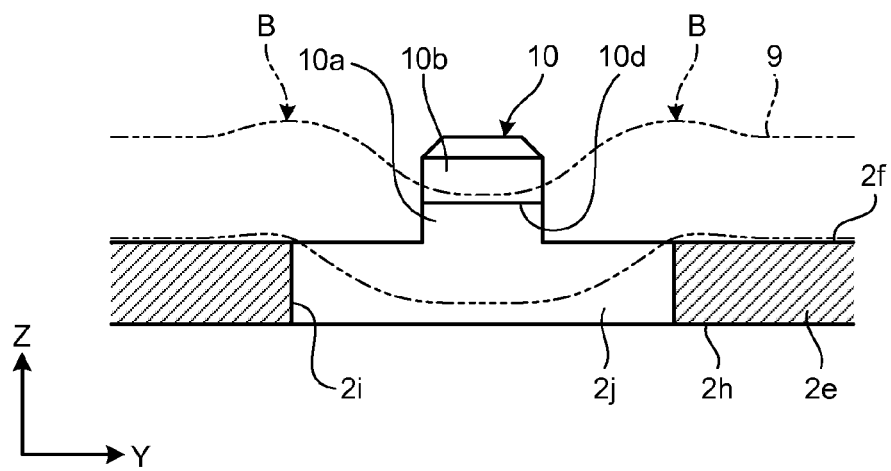
FIG. 5 is an exemplary cross-sectional view taken along line V-V in FIG. 3 in the embodiment.

As illustrated in FIG. 5, since each of the cables 9 is fitted in the recessed portion 2i, a bending portion B that is bent from the inner surface 2f into the recessed portion 2i is slightly raised on the inner surface 2f. According to the embodiment, since the recessed portion 2i is formed elongated along the direction in which the cables are routed, it is possible to reduce the curvature radius of the bending portion B, and thereby to reduce the height of the bending portion B of the cables 9 from the inner surface 2f.

Figure 6:
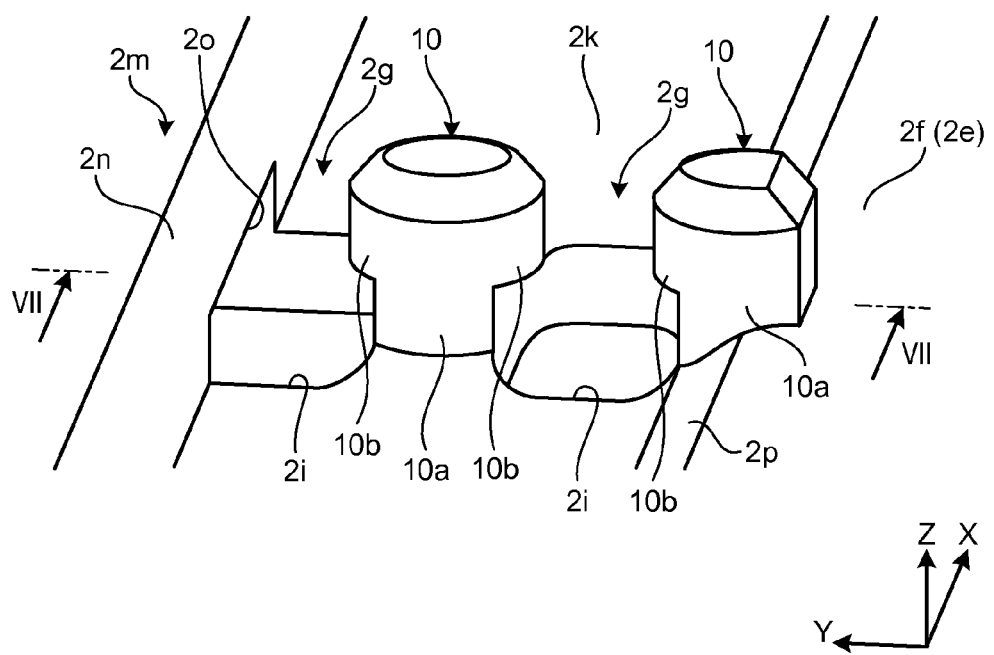
FIG. 6 is another exemplary perspective view of the protrusions in the embodiment.

A description will be given of the two protrusions 10 illustrated on the upper left side of FIG. 2 with reference to FIGS. 6 and 7 in addition to FIG. 2.

The two protrusions 10 are located near a vertical wall 2m extending vertically from the inner surface 2f. The protrusions 10 are aligned along the normal direction of a side surface 2n of the vertical wall 2m. The two protrusions 10 are aligned in the Y direction, and the cables 9 are routed in the X direction between them.

The two protrusions 10 hold one of the cables 9 (not illustrated in FIGS. 6 and 7) therebetween as with the four protrusions 10 described above. In the embodiment, one of the cables 9 may be held in the gap 2g between the vertical wall 2m and one of the protrusions 10 located near the vertical wall 2m. In this case, the vertical wall 2m serves as another protrusion with respect to the one of the protrusions 10.

Figure 7:
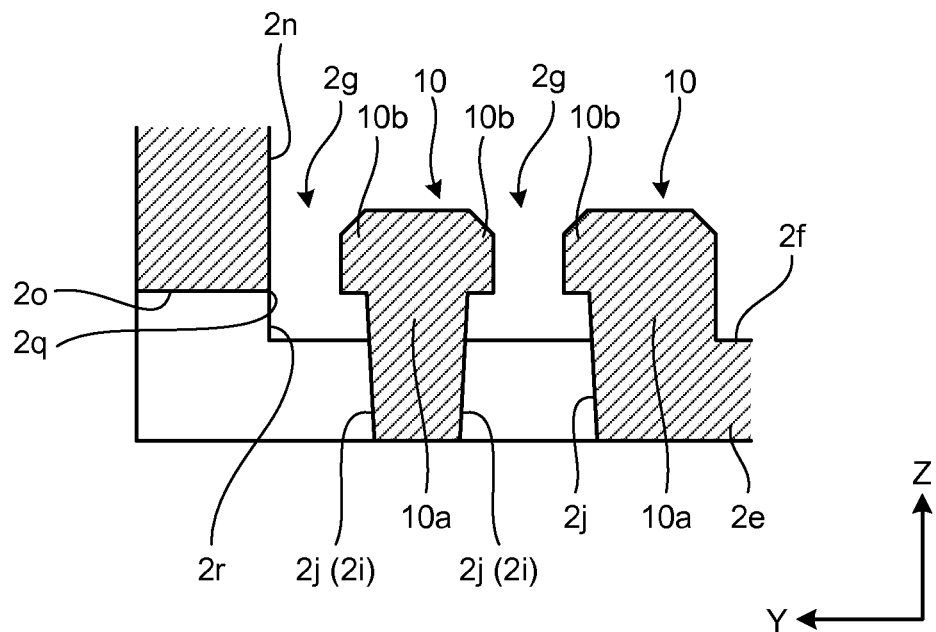
FIG. 7 is exemplary cross-sectional view taken along line VII-VII in FIG. 6 in the embodiment.

As illustrated in FIG. 7, a portion of the side surface 2n of the vertical wall 2m is recessed vertically to the side surface 2n as a recessed portion 2o. The recessed portion 2o is formed as a through hole that passes through the vertical wall 2m. The recessed portion 2o is coupled with the recessed portion 2i formed in the base portion of one of the protrusions 10, thereby forming one recessed portion. One of the cables 9 is fitted also in the recessed portion 2o. On the vertical wall 2m side, the cable 9 is in contact with an edge 2q of the recessed portion 2o, an edge 2r of the recessed portion 2i, and the like. As can be seen from the comparison with FIG. 4, the cable 9 in not likely to be pressed from the vertical wall 2m side, which facilitate to alleviate the stress on the cable 9.

The use of the vertical wall 2m eliminates the need to provide the protrusion (10). Thus, the space inside the housing 2a can be more effectively used. A groove 2k is formed in a portion where the cables 9 are routed by the protrusions 10 and the vertical wall 2m. The groove 2k is recessed by one step from the inner surface 2f through an inclined surface 2p. The groove 2k further prevents the cables 9 from deviating from the desired route. Moreover, the groove 2k serves as a marker to install the cables 9.

Figure 8:
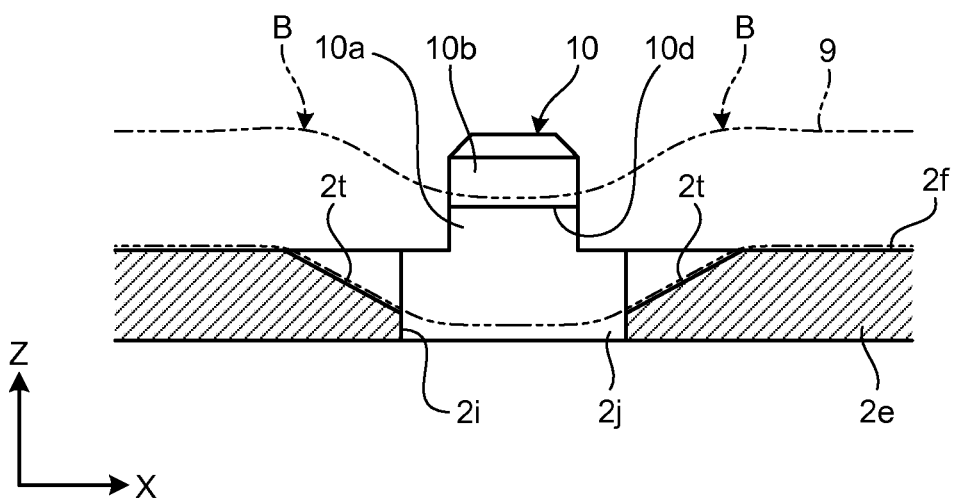
FIG. 8 is an exemplary cross-sectional view of protrusions in the same view as in FIG. 5 according to a modification of the embodiment.

FIG. 8 is a cross-sectional view of protrusions in the same view as in FIG. 5 according to a modification of the embodiment. According to the modification, an inclined surface $2t$ is formed on both edges of the recessed portion $2i$ in the direction in which the cables are routed (in FIG. 8, the X direction). The inclined surface $2t$ is inclined from the inner surface $2f$ toward the deeper center of the recessed portion $2i$. The inclined surface $2t$ absorbs the angle difference between the part of the cables 9 fitted in the recessed portion $2i$ and the part on the inner surface $2f$. This can further reduce the height of the bending portion B of the cables 9 from the inner surface $2f$. Moreover, the inclined surface $2t$ reduces the length of the recessed portion $2i$ in the direction in which the cables 9 are routed, and increases the rigidity.

As described above, according to the embodiment, the recessed portion is formed on the inner surface $2f$ of the bottom wall $2e$ between the protrusions 10 or one of the protrusions 10 and the vertical wall $2m$. The cables 9 are each elastically held between the protrusions 10 or one of the protrusions 10 and the vertical wall $2m$ while at least part thereof is fitted in the recessed portion $2i$. Accordingly, the cables 9 can be installed with high accuracy along a desired route. Further, since part of each of the cables 9 is fitted in the recessed portion $2i$, the height by which the protrusions 10 protrude can be reduced. This facilitates to apply the protrusions 10 to a small space with a short height and route the cables 9 along a desired route. Moreover, the cables 9 can each be relatively easily placed in between the protrusions 10 or one of the protrusion 10 and the vertical wall $2m$ by only pushing it from above into the gap $2g$. On the other hand, if the hook-like protrusion 11 is used, the cables 9 need to be hooked thereon, which necessitates troublesome work.

According to the embodiment, the protrusions 10 are each provided with the flared portion $10b$ which flares toward the facing protrusions 10 at a position higher than the inner surface $2f$. The flared portion $10b$ prevents each of the protrusions 10 from coming out of the gap $2g$. Moreover, by bringing each of the cables 9 in contact with the lower surface $10c$ and edge $10d$ of the flared portion $10b$, the cables 9 can be further reliably held.

The structure that elastically holds the cables 9 as described above can be suitably applied to, for example, an electronic device comprising a recessed portion or the like formed as a component container to house a removable component such as a battery, a hard disk drive (HDD), or the like. In a portion where the component container is formed in the housing, the component container occupies some space, which causes the space inside the partition wall to be small. Especially, to a space with a short height from the inner surface (front surface) of the partition wall, conventional protrusions with a high height are not suitably applied. On the other hand, according to the embodiment, each of the cables 9 is held while being partly fitted in the recessed portion $2i$. Thus, the protrusions 10 can be shorter and suitably applied to the space inside the partition wall of the component container. That is, the protrusions 10 can be formed on the inner surface $2f$ opposite the component container with the partition wall as the bottom wall $2e$. Further, as in the embodiment, if the recessed portion is formed on the partition wall as a through hole, it is desirable that the through hole be not exposed on the outer surface of the housing. In view of this point, the protrusions 10 and the recessed portion $2i$ as a through hole are formed on the partition wall of the component container, and the recessed portion $2i$ can be covered from the outside with a component housed in the component container or the cover of the component container.

While the electronic device 1 of the embodiment is described above by way of example as a notebook personal computer, it may be any other electronic device than a notebook personal computer. The specification (location, size, shape, number, material, direction, etc.) can be changed as required for the housings, the walls, the protrusions, the recessed portion, the flared portion, the vertical wall, and the like. Further, the protrusions may be provided on the outer surface the housing so that the cables can be routed along the outer surface.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   a housing comprising a wall;
   a cable routed along a surface of the wall;
   a first protrusion protruding from the surface;
   a second protrusion protruding from the surface; and
   a recessed portion between the first protrusion and the second protrusion, the recessed portion being along a first direction in which the cable is routed, wherein
   a portion of the cable is held between a side surface of the recessed portion in a second direction perpendicular to the first direction, and
   the side surface of the recessed portion holding the portion of the cable is positioned lower than the surface.

2. The electronic device of claim 1, wherein
   the wall is a partition wall of a component container in the housing, and
   the component container is configured to removably house a component.

3. An electronic device comprising:
   a housing comprising a wall, the wall comprising a first protrusion protruding from a surface of the wall and a second protrusion protruding from the surface and a recessed portion between the first protrusion and the second protrusion; and
   a cable routed between the first protrusion and the second protrusion along a longitudinal direction of the recessed portion, and held by a side surface of the recessed portion, and
   the side surface of the recessed portion holding the cable is positioned lower than the surface.

4. The electronic device of claim 3, wherein at least one of the first protrusion and the second protrusion comprises a flared portion that flares toward a side on which the cable is routed at a position higher than the surface of the wall on which the first protrusion and the second protrusion are formed.

5. The electronic device of claim 4, wherein a distance from a lower surface of the flared portion to a deepest position of the recessed portion is larger than a diameter of the cable.

6. The electronic device of claim 4, wherein a distance from the flared portion of one of the first protrusion and the second protrusion to a portion opposite to the flared portion of the other of the first protrusion and the second protrusion is smaller than a diameter of the cable.

7. The electronic device of claim 4, wherein
the flared portion comprises an inclined surface that introduces the cable to the recessed portion, and
the inclined surface is formed on a surface of the flared portion.

8. The electronic device of claim 3, wherein a height of at least one of the first protrusion and the second protrusion from the surface of the wall on which the first protrusion and the second protrusion are formed is equal to or less than a diameter of the cable.

9. The electronic device of claim 3, wherein a width of the recessed portion in a direction perpendicular to the longitudinal direction of the recessed portion is equal to or less than a diameter of the cable.

10. The electronic device of claim 3, wherein the at least one of the first protrusion and the second protrusion is formed in a columnar shape.

11. The electronic device of claim 3, wherein
one of the first protrusion and the second protrusion is a vertical wall, and
the electronic device further comprises a second recessed portion on a side surface of the vertical wall at a portion that faces the other of the first protrusion and the second protrusion.

12. The electronic device of claim 3, wherein the recessed portion comprises an inclined surface in an outer edge in the longitudinal direction of the recessed portion, wherein
a depth of the inclined surface from the surface of the wall on which the first protrusion and the second protrusion are formed increases toward a center of the recessed portion along the longitudinal direction of the recessed portion.

13. The electronic device of claim 3, wherein the wall further comprises a third protrusion and a second recessed portion between the third protrusion and the first protrusion.

14. The electronic device of claim 13, further comprising a second cable routed between the third protrusion and the first protrusion along the longitudinal direction of the second recessed portion, and held by a side surface of the second recessed portion.

* * * * *